(12) United States Patent
Smith

(10) Patent No.: US 6,371,048 B1
(45) Date of Patent: *Apr. 16, 2002

(54) CAT LITTER BOX

(76) Inventor: Jason T. Smith, 2460 Hamilton Parc La., Buford, GA (US) 30519

( * ) Notice: Subject to any disclaimer, the term of this patent is extended or adjusted under 35 U.S.C. 154(b) by 0 days.

This patent is subject to a terminal disclaimer.

(21) Appl. No.: 09/619,097

(22) Filed: Jul. 19, 2000

(51) Int. Cl.[7] .............................................. A01K 29/00
(52) U.S. Cl. ...................... 119/166; 119/165; 119/168
(58) Field of Search ................................. 119/165, 166, 119/161, 167, 168

(56) References Cited

U.S. PATENT DOCUMENTS

| | | | | |
|---|---|---|---|---|
| 3,618,568 A | | 11/1971 | Breenden ................ 119/165 X |
| 5,329,878 A | * | 7/1994 | McCauley ................. 119/165 |
| 5,329,879 A | | 7/1994 | Walton .................... 119/165 X |
| 5,361,725 A | | 11/1994 | Baillie ........................ 119/165 |
| 5,448,965 A | | 9/1995 | McClure ................. 119/485 X |
| 5,676,090 A | * | 10/1997 | Cannady, Jr. ............... 119/165 |
| 5,713,302 A | * | 2/1998 | Walter ........................ 119/165 |
| 5,806,461 A | * | 9/1998 | Kiera ......................... 119/165 |
| 5,911,194 A | * | 6/1999 | Pierson, Jr. ................. 119/166 |
| 5,924,383 A | | 7/1999 | Smith ......................... 119/165 |

OTHER PUBLICATIONS

R.C. Steele Catalog, Midsummer 1997, p. 57, Brockport, NY 14420.
R.C. Steele Catalog, Midsummer 1997, p. 59, Brockport, NY 14420.

* cited by examiner

Primary Examiner—Peter M. Poon
Assistant Examiner—Judith A. Nelson
(74) Attorney, Agent, or Firm—Baker, Donelson, Bearman & Caldwell

(57) ABSTRACT

A cat litter box has a tray having a bottom from which sides upwardly extend to an upper lip and a lid for the tray which has a top from which sides downwardly extend to a lower lip configured to be supported upon the tray upper lip. The lid sides are formed with an opening through which cats may come and go. A ramp having a rough litter-dislodging surface is mounted in the tray extending upwardly from adjacent the tray bottom to adjacent the lid side wall opening.

7 Claims, 2 Drawing Sheets

CAT LITTER BOX

TECHNICAL FIELD

This invention relates to cat litter boxes.

BACKGROUND OF THE INVENTION

Cat litter is widely used today to provide absorbent material for cat waste, i.e urine and feces. The litter is housed in a litter box or tray. The litter boxes often are covered for aesthetics and odor reduction with entry being had by a side opening in the cover.

A persistent problem with the use of cat litter boxes and trays is that of cats tracking litter onto the floor or carpet when leaving the litter box. Over the period of a day or two a significant amount of unsightly litter typically accumulates near the box. Attempts at training cats to wipe their paws upon leaving the box are useless due to their independent nature.

Heretofore I addressed this problem by inventing a threshold for a covered type cat litter box having a side entry as shown and described in U.S. Pat. No. 5,924,383. The threshold comprised a stand that supported an elevated cat landing field, a ramp having a rough litter-dislodging surface that extended down from the landing field, and a barrier in the form of a cover for barring cats from jumping onto or off the sides of the ramp. By setting the threshold with the ramp accessible to the litter box entry, cats could ingress and egress the box only via the threshold rough litter-dislodging ramp and the landing field.

I have since found that cats are often hesitant to enter a litter box through such a threshold. Apparently some find the covered ramp to be a tunnel with an uncertain end that they cannot see until they have jumped up onto the landing field. Moreover, the presence of the threshold, which juts out from the litter box, places the litter further away from the entry. This in turn makes the litter odor weaker and thus less attractive. The addition of the threshold also enlarges the overall litter box, the presence of which is usually considered a necessary evil.

Accordingly, it is seen that were a litter box to be devised without the just mentioned disadvantages of an add-on threshold, and yet with the advantage it provides in dislodging and collecting litter from the paws of departing cats, rather than have such tracked about, a definitive advance would be achieved. It thus is to the provision of such that the present invention is primarily directed.

SUMMARY OF THE INVENTION

In a preferred form of the invention, the new cat litter box comprises a tray having a bottom from which sides upwardly extend to an upper lip and a lid for the tray has a top from which sides downwardly extend to a lower lip configured to be supported upon the tray upper lip. The lid sides are formed with an opening through which cats may come and go. A ramp having a rough litter-dislodging surface is mounted in the tray extending upwardly from adjacent the tray bottom to adjacent the lid side wall opening.

In another preferred form the cat litter box comprises a tray having a bottom upon which litter may be spread. The box has a lid removably mounted upon the tray which has an opening through which cats may pass. A walkway with a rough litter-dislodging surface is mounted in the tray. The walkway has a substantially level landing field portion located adjacent the lid opening from which an extension portion extends. An upright barrier is mounted on the walkway beside the level landing field portion to prevent a cat from bypassing the walkway extension portion in exiting the box.

DETAILED DESCRIPTION

Figure 1:
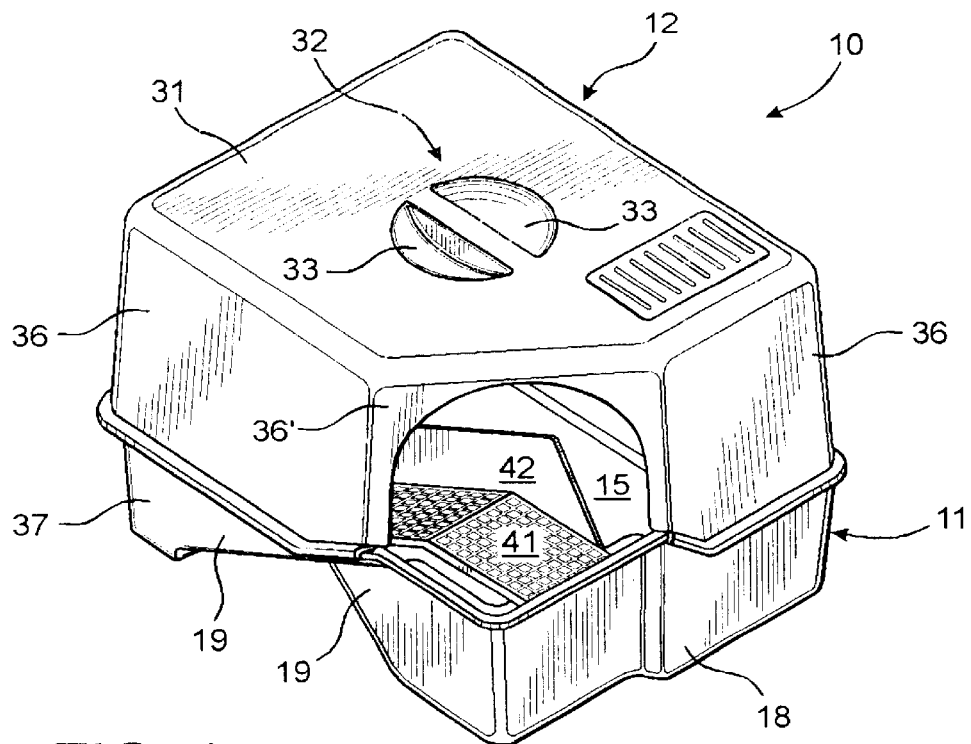
FIG. 1 is a perspective view of a cat litter box that embodies principles of the invention in its preferred form.
Figure 3:
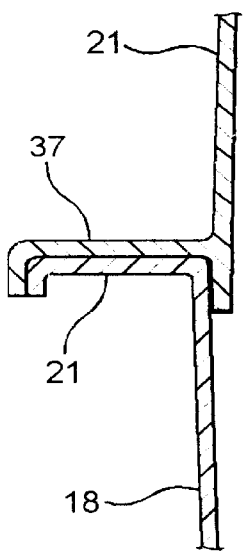
FIG. 3 is a cross sectional view of a fragment of the lid shown seated upon the tray.

With reference next in more detail to the drawings, there is shown a cat litter box 10 of molded plastic construction which has a tray 11, a lid 12 and a walkway 13. The tray 11 is generally rectangular and has a bottom 15 from which four sides 16–19 upwardly extend. The sides 18 and 19 are seen to have a slight inward jog adjacent the tray corner shown in the foreground. The tray is also molded with an interior ledge 20 that extends level along the jog portion of side 18 and level along the jog portion of side 19. At the end of the jog it too widens and descends (not viewable) to the tray bottom 15. The top of the tray sides is formed with a lip or ridge 21, the details of which are shown in FIG. 3.

Figure 4:
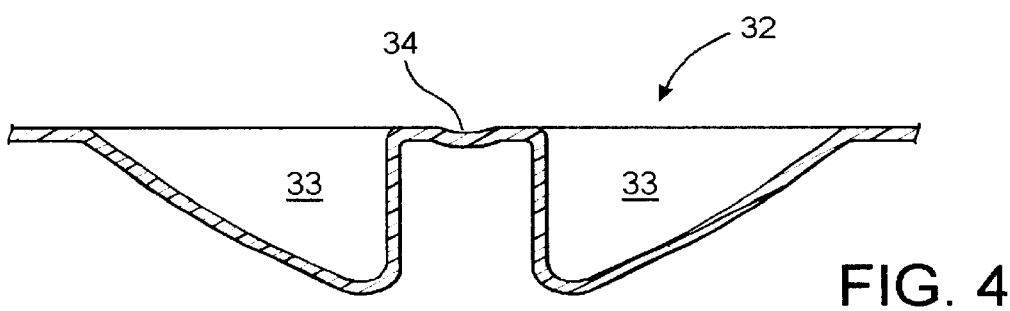
FIG. 4 is a cross sectional view of the lid handle.
Figure 2:
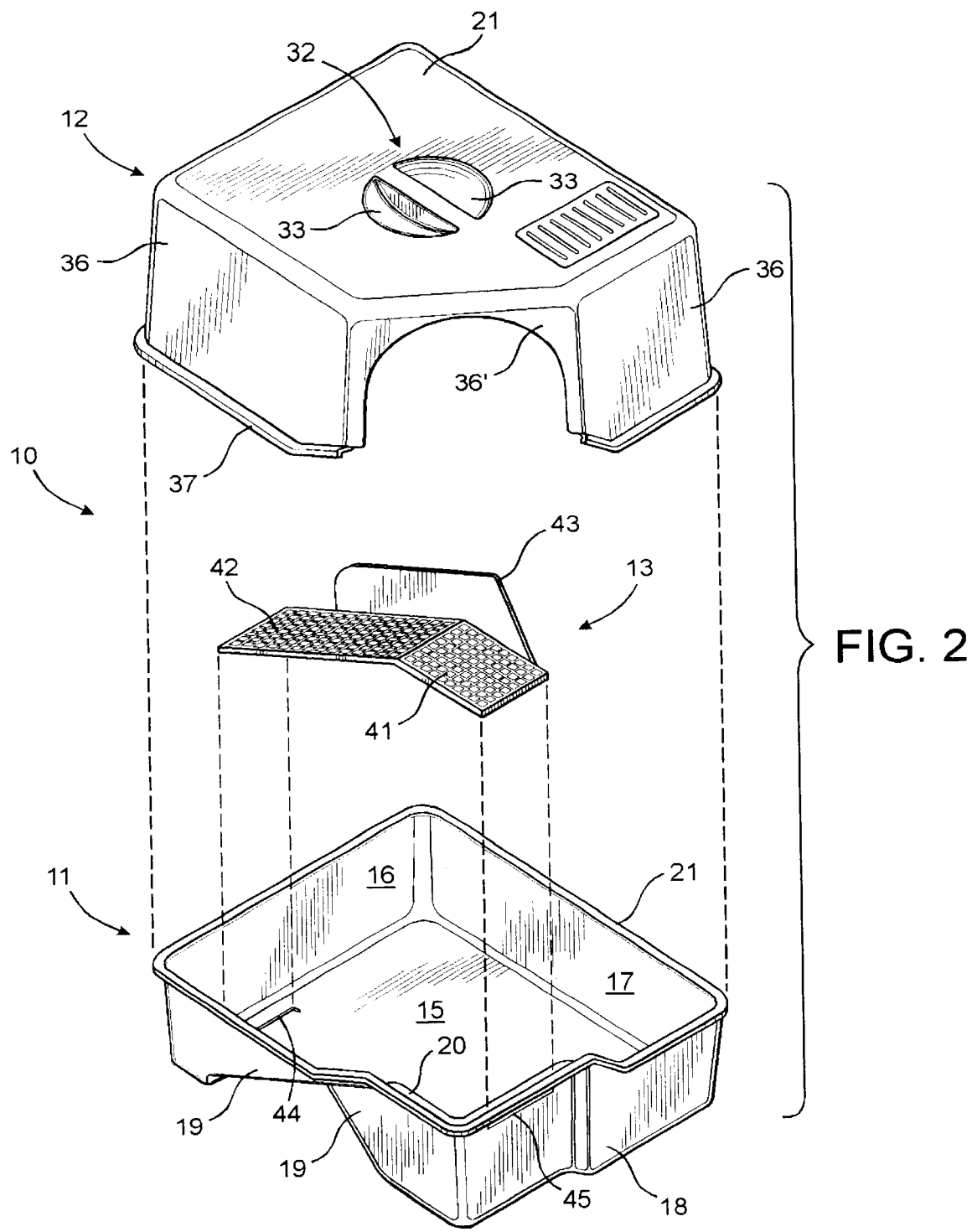
FIG. 2 is an exploded view of the cat litter box shown in FIG. 1 with its lid and ramp shown separated from its tray.

The cat litter box lid 12 has a flat top 31 of pentagonal shape in which a handle 32 is formed. The handle, an enlarged view of which is shown in FIG. 4, has two semispherical recesses 33 that straddle a bridge 34. The handle is used by placing a thumb in one recess and a finger or two in the other and gripping the bridge. The lid also has five sides 36 that depend from the top 31. The bottoms of these sides are formed with a flange 37, the details of which are best shown in FIG. 3. The flange is sized to fit snugly over the tray ridge 21 in removably mounting and securing the lid upon the tray. One of the lid sides 36' is seen to be formed with a large opening through which a cat may pass. Alternatively, that side may be completely open. Since side 36' cuts cata-cornered across the tray where sides 18 and 19 join, the area of the lid top 31 is less than the area of the tray bottom 15. This adds to the ease in which a cat may ingress and egress from the box.

The cat litter box walkway 13 is seen to have a level landing field portion 41 from which an inclined ramp portion 42 extends. Each is constructed of a rough, open grating through which litter may fall. The walkway has an upright side 43 that extends along one side of portions of the landing field and ramp. The walkway is sized to be set upon the ledge 20 of the tray with its bottom end tucked within a recess 44 and with its other end tucked through a slot 45 under the ridge 21 of tray wall 18. As the walkway is a little resilient, it can be flexed slightly in inserting and extracting it from the recess 44 and slot 45.

For use the landing field 41 is very accessible to a cat since much of it is unsheltered by the lid. Litter odor may also easily flow to this area over the walkway side 43 to further entice the cat. Thus a tunnel effect is substantially avoided. When a cat leaves the box it must walk up the ramp to jump off the landing field. Both of these movements upon the grated surface of the walkway serve to remove litter from the paws which falls through the grating to the bottom of the tray. For filling, cleaning and refilling the lid and runway may be easily removed from the tray and then remounted.

It thus is seen that a cat litter box is now provided which is of a compact, sightly construction and yet which is effective in removing litter from exiting cat paws without hindering cat entry. It is also simple to fill, refill and clean. Though the box has been shown and described in its preferred form it should be understood that many modifications, changes or additions may be made without departure from the spirit and scope of the invention as set forth in the following claims.

What is claimed is:

1. A cat litter box comprising a tray having a bottom from which sides upwardly extend to an upper lip, a lid for said tray having a top from which sides downwardly extend to a lower lip configured to be supported upon said tray upper lip, said lid sides being formed with an opening through which cats may pass, and a ramp having a rough litter-dislodging surface mounted in said tray extending upwardly from adjacent said tray bottom to adjacent said lid sides opening, and said tray bottom has a bottom area and is substantially rectangular and said lid top has an area less than said tray bottom area and is substantially pentagonal whereby a corner portion of the tray interior is exposed from above.

2. The cat litter box of claim 1 wherein said lid side opening is located adjacent said exposed tray corner portion.

3. A cat litter box comprising a tray having a bottom upon which litter may be spread and a lid removably mounted upon said tray, said lid having an opening through which a cat may pass, and a walkway with a rough litter dislodging surface mounted in said tray that has a substantially level landing field portion located adjacent said opening from which an extension portion extends, and an upright barrier mounted on said walkway beside said level landing field portion to prevent a cat from bypassing said walk extension portion in exiting the box from the tray bottom.

4. The cat litter box of claim 3 wherein both said walkway landing field portion and extension portion have a rough litter dislodging surface.

5. The cat litter box of claim 3 wherein said walkway is removably mounted in said tray.

6. The cat litter box of claim 5 wherein said tray has a support upon which said walkway is replacebly mounted.

7. A cat litter box comprising a tray having a bottom from which sides upwardly extend to an upper lip, a lid for said tray having a top from which sides downwardly extend to a lower lip configured to be supported upon said tray upper lip, said lid top being smaller than said tray bottom whereby a portion of said tray is exposed with the lid supported upon the tray, and where one of said lid sides is formed with an opening thorough which cats may pass, said lid one side said being adjacent said tray exposed portion, and a ramp having a rough litter-dislodging surface mounted in said tray extending upwardly from adjacent said tray bottom to adjacent said lid side opening.

* * * * *